(No Model.)
J. O'CONNELL.
BAND CUTTER.
No. 513,366.
Patented Jan. 23, 1894.
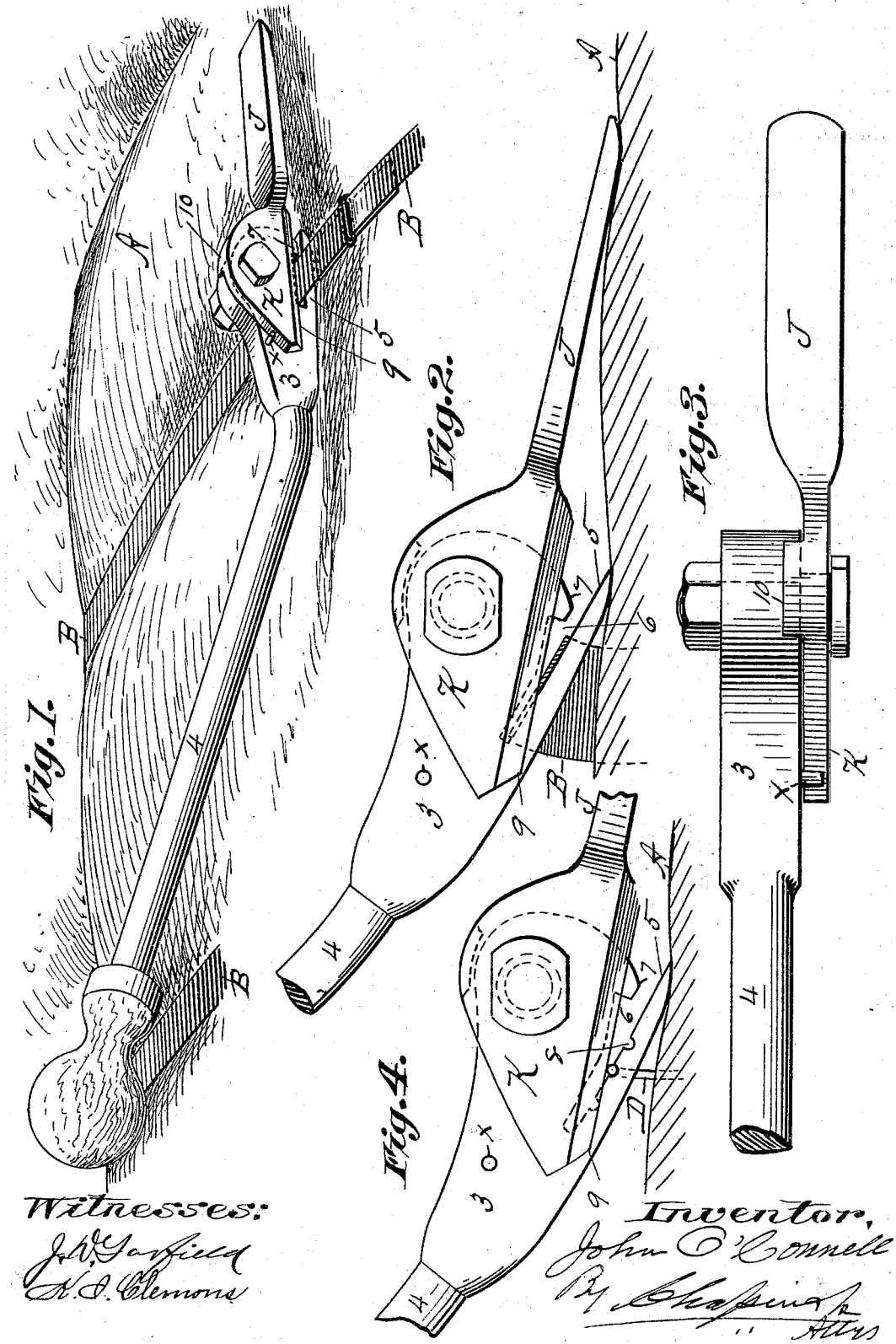

UNITED STATES PATENT OFFICE.

JOHN O'CONNELL, OF SPRINGFIELD, MASSACHUSETTS.

BAND-CUTTER.

SPECIFICATION forming part of Letters Patent No. 513,366, dated January 23, 1894.

Application filed May 11, 1893. Serial No. 473,826. (No model.)

*To all whom it may concern:*

Be it known that I, JOHN O'CONNELL, a citizen of the United States of America, residing at Springfield, in the county of Hampden and State of Massachusetts, have invented new and useful Improvements in Bale Tie or Band Cutters, of which the following is a specification.

This invention relates to instruments for cutting ties, bands, or wires from bales of cotton, hay, or other material, the object being to provide an improved band cutter for said uses whereby the cutting of said bands or ties is rendered easy and rapid, and the invention consists in the construction and arrangement of the several parts of the said cutter, all as hereinafter fully described and more particularly pointed out in the claims.

In the drawings forming part of the specification,—Figure 1 illustrates in perspective view the upper side of a bale of matter and a band-cutting device shown in engagement with one of the bands of said bale, constructed according to my invention. Fig. 2 illustrates a portion of said band-cutter in side elevation showing the position of the parts thereof while cutting a band. Fig. 3 is a top plan view of the cutting device shown in Fig. 2. Fig. 4 is a similar view to Fig. 2, but showing the adaptation of the device for cutting ordinary wire-banding from bales of hay.

In the drawings, A indicates a bale of cotton, or like material, and B portions of iron bands of the usual character secured around it.

The band cutting device herein shown and described consists of a metallic head, 3, of suitable steel or iron, having a handle-arm, 4, extending therefrom on the extremity of which is a suitable handle, as shown. The said head, 3, is provided on its under side with a wedge-shaped lip, 5, having an extremity of chisel-shape. The said lip, 5, is constructed, preferably, of the same piece of metal as the head, 3, and between the latter and said lip is formed a slot, 6, in which the binding-band, B, of the bale is received, prior to cutting the same. Also said slot, 6, receives therein the binding wire, D, shown in Fig. 4, when a wire band is to be cut. The said chisel-shaped end of the lip, 5, facilitates entering the same between a band and the bale, A, preparatory to operating the device to cut the band. The head, 3, is constructed, preferably, with a pending nose, 7, opposite the inner side of said lip 5, as shown in Figs. 1, 2, and 4, for engagement with the edge of the band, B, when the cutting thereof commences, for the purpose of preventing the cutter-head and the band from sliding apart when the cutter commences to operate, as below described. Said nose, 7, may be dispensed with by forcibly pushing the cutter toward the band, when beginning to cut the latter, but it is less laborious to employ the said nose, 7, for the purpose stated.

The cutter-head, constructed as above described, may be conveniently employed for cutting wire-bands above referred to, but it is more convenient for the last named purpose to form a series of transverse grooves, 8, as shown in Fig. 4, in the inner surface of the lip, 5, with which grooves the wire-bands engage when the lip, 5, is forced between them and the bale on which they are secured, and thereby said wires are prevented from sliding on the lip when the cutter shall begin to act against it, or them.

The cutter, which operates with the above described head device, is indicated in the drawings by K, and is made of suitable thickness and width, as shown, preferably of steel, and having a suitable cutting edge, 9, thereon, and is pivoted on the side of said head, 3, by a suitable bolt, as shown, and at the forward end of said cutter, K, extends a flat lever-arm, J, which bears against the bale, A, when the handle of the cutting device is lifted by the operator to draw the band, B, against the cutting edge of said cutter, as shown in Fig. 2.

It will be easily understood, from the above description, that the band, when lifted against the cutter by the lip, 5, as aforesaid, is pressed forcibly against the edge, 9, of the cutter, and the head, 3, is, by said band, held from rising, but has a swinging movement whereby the band is forced against the edge of the cutter, as aforesaid. The pivot connection of the cutter, with the head, 3, allows the latter to swing while the cutter is thereby held against the band, and on the lever-arm, J, serves still further to maintain the cutter in operative position while the band is being cut. Thus the cutter, as shown in Fig. 2, attacks one edge of the band first, and cuts gradually across the same to the opposite edge to sever it. Thus the said cutter is held in proper relative position to the upwardly moving lip, 5, under the band whereby the latter is gradually cut from one edge to the other, as indicated in Fig. 2, and by using one hand only to operate the device. This convenience results from the extension of the lever-arm, J, from the cutter, K.

A projecting boss, 10, is formed on the side of the cutter, K, and overhangs, slightly, the upper edge of the head, 3, and serves as a stop which, by engagement with the head, when the cutter may be swung to carry its lever arm vertically from the bale to an excessive degree, prevents said lever arm from swinging quite backward against the handle-arm, thereby tending to keep the cutter from assuming any position that might interfere with its convenient use.

A stud, x, is fixed in the side of the head, 3, to serve as a stop with which the nose of the cutter engages when the lever-arm, J, drops downward, thereby aiding also to retain the cutter from swinging to inconvenient positions which might interfere with the convenient and quick operation of the device in cutting bands.

The operation of the within described band-cutter will be easily understood, but it may not be out of place to say further, that in using the device the operator forces the lip, 5, under the band, then gives the handle a quick movement upward nearly to a vertical position, and the band is cut, the horizontally extending lever-arm, J, meanwhile bearing on the top of the bale, and holding the cutter, K, in proper position by the side of the head, 3.

The use of this device obviates the ordinary inconvenient manner of cutting said bands by ordinary hand-shears, or by the use of a chisel and a hammer, and enables the operator to clearly ascertain and determine where the band shall be cut, without incurring the danger of cutting off a short piece of the doubled-under end of the band. Short pieces, when so cut off, oftentimes get into the cotton and find their way into the pickers and carding machines and do much damage thereto.

What I claim as my invention is—

1. A band-cutter consisting of a head having a lip thereunder, and a band-receiving slot between said lip and head, a handle-arm extending from said head, and a cutter pivoted on the side of said head having a lever-arm thereon, extending in a direction opposite to that of said handle-arm, the cutting edge of which cutter is contiguous to said slot, combined and operating substantially as set forth.

2. A band-cutter consisting of a head having a lip thereunder, a band-receiving slot between said lip and head, a pending nose, 7, extending partly across said slot, and a handle-arm thereon, combined with a cutter pivoted on the side of said head having a lever-arm thereon extending in a direction opposite to that of said handle-arm, the cutting edge of which cutter is contiguous to said slot, substantially as set forth.

3. A band-cutter consisting of a head having a lip thereunder, a band-receiving slot between said lip and head, a pending nose, 7, extending partly across said slot, and a handle-arm thereon, combined with a cutter pivoted on said head having a lever-arm thereon extending in a direction opposite that of said handle-arm, pivoted on said head, whose cutting edge is contiguous to said slot and a boss, 10, thereon, for engagement with said head, substantially as set forth.

JOHN O'CONNELL.

Witnesses:
H. A. CHAPIN,
WM. S. BELLOWS.